US011926025B2

(12) United States Patent
Andrews

(10) Patent No.: US 11,926,025 B2
(45) **Date of Patent: *Mar. 12, 2024**

(54) RETAINING RING PLIER SYSTEMS AND METHODS

(71) Applicant: Tiger Tool International Incorporated, Abbotsford (CA)

(72) Inventor: Michael Andrews, Bellingham, WA (US)

(73) Assignee: Tiger Tool International Incorporated, Abbotsford (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/450,039

(22) Filed: Oct. 5, 2021

(65) Prior Publication Data

US 2022/0048172 A1 Feb. 17, 2022

Related U.S. Application Data

(63) Continuation of application No. 16/354,942, filed on Mar. 15, 2019, now Pat. No. 11,135,711.

(60) Provisional application No. 62/644,326, filed on Mar. 16, 2018.

(51) Int. Cl.
*B25B 27/20* (2006.01)

(52) U.S. Cl.
CPC .................................. *B25B 27/205* (2013.01)

(58) Field of Classification Search
CPC ....... B25B 27/20; B25B 27/205; B25B 27/02; B25B 7/123; B25B 7/04; B25B 7/12; B25B 7/16; B25B 7/18; B25B 7/20; B25B 7/26; B25B 7/28; B25B 7/30; B25B 7/00; H01R 43/042
See application file for complete search history.

(56) References Cited

U.S. PATENT DOCUMENTS

| | | | |
|---|---|---|---|
| 569,527 | A | 10/1896 | Tilton |
| 689,154 | A | 12/1901 | Bartlett |
| 1,131,868 | A | 3/1915 | Ridlon |
| 1,155,720 | A | 10/1915 | Louis |
| 1,334,658 | A | 3/1920 | Koch |

(Continued)

FOREIGN PATENT DOCUMENTS

| | | | |
|---|---|---|---|
| AU | 2015334596 | A1 | 5/2017 |
| AU | 2015335682 | A1 | 5/2017 |

(Continued)

OTHER PUBLICATIONS

Canadian Intellectual Property Office, "Office Action, Application No. 2,880, 139,", dated Jan. 7, 2019, 3 pages.

(Continued)

*Primary Examiner* — Robert J Scruggs
(74) *Attorney, Agent, or Firm* — Schacht Law Office, Inc.; Michael R. Schacht

(57) ABSTRACT

A plier assembly comprising first and second handle assemblies each comprising a frame assembly, a support block, a tip assembly, a proximal pin, and a distal pin. A main hinge assembly supports the second handle assembly for movement relative to the first handle assembly. The proximal openings are sized and dimensioned such that, as the second handle assembly moves relative to the first handle assembly, longitudinal axes of the support block are substantially parallel.

32 Claims, 5 Drawing Sheets

(56) References Cited

U.S. PATENT DOCUMENTS 1,368,760 A 2/1921 Schilling
1,429,567 A 9/1922 Carlisle
1,476,983 A 12/1923 King
1,498,638 A 6/1924 Periolat
1,552,616 A 9/1925 Jake
1,650,964 A 11/1927 Schmitt
1,682,956 A 9/1928 Dawson et al.
1,778,802 A 10/1930 Howell
1,817,988 A * 8/1931 Klamt ...................... B25B 7/14 81/352
1,849,805 A 3/1932 Raymond
1,857,211 A 5/1932 Odlum et al.
1,990,570 A 2/1935 Smith
1,996,967 A 4/1935 Kratky
2,036,782 A 4/1936 Ullmo
2,052,534 A 8/1936 Quarles
2,290,427 A 7/1942 Harrington
2,374,861 A 5/1945 Graham
2,380,980 A 8/1945 Looney
2,427,948 A 9/1947 Cornwell
2,484,129 A 10/1949 Taylor
2,549,429 A 4/1951 Cowles
2,681,501 A * 6/1954 Schrem ................ F16C 35/062 29/261
2,755,540 A 7/1956 Crozier
2,798,392 A 7/1957 Randolph
3,102,333 A 9/1963 Thornton et al.
3,200,483 A 8/1965 Menegoni
3,237,291 A 3/1966 Kelso
3,336,652 A 8/1967 Andre
3,662,449 A * 5/1972 Hashimoto .......... B25B 27/205 29/229
3,742,570 A 7/1973 Felser
3,862,483 A 1/1975 Kloster
3,964,149 A 6/1976 Hugh
4,034,458 A 7/1977 Ford et al.
4,195,398 A 4/1980 Matthews
4,363,475 A 12/1982 McCarty
4,398,706 A 8/1983 Kaulfuss
4,426,758 A 1/1984 Castoe
4,428,105 A 1/1984 Abbott et al.
4,589,180 A 5/1986 Vachon
4,624,039 A 11/1986 Lawrence et al.
4,648,166 A 3/1987 Tilman
4,649,615 A 3/1987 Hundley
4,672,731 A 6/1987 Taylor
4,691,424 A 9/1987 Michael et al.
4,765,057 A 8/1988 Muller
4,769,890 A 9/1988 Maynard
4,770,401 A 9/1988 Donaldson
4,771,528 A 9/1988 Stromberg
4,867,366 A 9/1989 Kleinholz
4,940,370 A 7/1990 Gipson
4,941,252 A 7/1990 Haisch et al.
4,976,280 A 12/1990 Lagana
4,977,660 A 12/1990 Maynard
5,125,324 A 6/1992 Araki et al.
5,159,743 A 11/1992 Somerville
5,163,665 A 11/1992 Klearman
5,174,005 A 12/1992 Somerville
5,181,303 A 1/1993 Gregg
5,210,919 A 5/1993 Garman
5,211,211 A 5/1993 Rubino et al.
5,224,254 A 7/1993 McPeak et al.
5,233,741 A 8/1993 Maynard
5,255,435 A 10/1993 Shultz
5,257,445 A 11/1993 Mayberry
5,271,136 A 12/1993 Skoworodko
5,341,553 A 8/1994 Herzhauser
5,355,574 A 10/1994 Zweekly et al.
5,419,027 A 5/1995 McPeak et al.
5,519,929 A 5/1996 Bleckman
5,535,973 A 7/1996 Bailey et al.
5,557,833 A 9/1996 Pool
5,586,378 A 12/1996 Smith
5,606,788 A 3/1997 Rubino et al.
5,692,437 A 12/1997 Tabain
5,787,561 A 8/1998 Harmand
5,839,180 A 11/1998 Hochmiller
RE36,009 E 12/1998 Shultz
5,857,252 A 1/1999 Jansen
5,887,328 A 3/1999 Rydin et al.
5,893,202 A 4/1999 Graham et al.
5,898,985 A 5/1999 Villarreal
5,983,474 A 11/1999 Koppe
6,192,566 B1 2/2001 Dunum
6,505,390 B2 1/2003 Emanuel
6,574,843 B1 6/2003 Meadows
6,618,920 B1 9/2003 Emanuel
6,716,218 B2 * 4/2004 Holmes .............. A61B 17/8866 606/105
6,789,791 B2 9/2004 Genduso
7,003,877 B2 2/2006 Reale
7,020,944 B2 4/2006 Klann
7,093,809 B2 8/2006 Hwang
7,117,573 B1 10/2006 Hu
7,213,317 B2 5/2007 Hu
7,219,885 B2 5/2007 Nardozza
7,387,296 B2 6/2008 Alberti
7,475,465 B1 1/2009 Weiss
7,520,041 B1 4/2009 Aguilar
7,669,305 B1 3/2010 Lionberg
7,669,306 B2 3/2010 Palka
7,685,688 B2 3/2010 Fan
7,707,709 B2 5/2010 Whitehead
7,717,573 B2 5/2010 Matsubara et al.
7,818,860 B2 10/2010 Hume et al.
7,890,305 B2 2/2011 Lionberg
7,891,084 B1 2/2011 Sollami
7,895,723 B2 3/2011 Wridt et al.
7,918,003 B2 4/2011 Acciardo, Jr.
7,996,972 B2 8/2011 Hu
8,387,252 B1 3/2013 Johnson et al.
8,567,292 B1 10/2013 Park et al.
8,627,557 B2 1/2014 Jansen et al.
8,689,420 B2 4/2014 Barrios et al.
8,745,832 B2 6/2014 Barrios et al.
9,107,719 B2 * 8/2015 Gauthier ............ A61B 17/0206
9,511,488 B2 12/2016 Andrews et al.
9,651,093 B2 5/2017 Robb, Jr.
9,718,177 B1 8/2017 Bell
9,751,199 B2 9/2017 Andrews
9,808,922 B2 11/2017 Breschi et al.
9,908,208 B2 3/2018 Andrews
9,981,368 B2 5/2018 Zeren et al.
10,005,175 B2 6/2018 Morris
10,265,839 B1 4/2019 Hunter
10,307,901 B2 6/2019 Andrews
10,486,293 B2 11/2019 Verkley
10,583,546 B2 3/2020 Yang
10,668,604 B2 6/2020 Caywood et al.
10,744,627 B2 8/2020 Andrews
10,906,140 B2 2/2021 Andrews
11,090,788 B2 8/2021 Huang
11,135,711 B2 * 10/2021 Andrews ............... B25B 27/205
11,815,132 B2 11/2023 Andrews
2001/0029655 A1 10/2001 Emanuel
2002/0095759 A1 7/2002 Scott
2003/0033909 A1 2/2003 Gore
2003/0084555 A1 5/2003 Meggiolan
2003/0106197 A1 6/2003 Emanuel
2005/0071973 A1 4/2005 Emanuel
2006/0037184 A1 2/2006 Miller
2006/0070221 A1 4/2006 Wridt et al.
2006/0162509 A1 * 7/2006 Wang ........................ B25B 7/16 81/355
2007/0251076 A1 11/2007 Zhong et al.
2008/0289841 A1 11/2008 Kang
2009/0025514 A1 1/2009 Barrios et al.
2009/0211094 A1 8/2009 Adelman
2010/0000749 A1 1/2010 Andel
2010/0236039 A1 9/2010 Robledo
2010/0251528 A1 10/2010 Hu
2010/0281665 A1 11/2010 Punaro

(56) References Cited

U.S. PATENT DOCUMENTS

| | | | |
|---|---|---|---|
| 2010/0283193 | A1 | 11/2010 | Huang |
| 2011/0048649 | A1 | 3/2011 | Komatsu et al. |
| 2011/0094076 | A1 | 4/2011 | Liu |
| 2011/0219617 | A1 | 9/2011 | Barrios et al. |
| 2012/0110815 | A1 | 5/2012 | Brown |
| 2012/0272499 | A1 | 11/2012 | Schley et al. |
| 2013/0026692 | A1 | 1/2013 | Prins |
| 2014/0338166 | A1 | 11/2014 | Studney |
| 2014/0345104 | A1 | 11/2014 | Andrews et al. |
| 2014/0366954 | A1 | 12/2014 | Miller et al. |
| 2015/0183102 | A1 | 7/2015 | Breschi et al. |
| 2015/0183268 | A1 | 7/2015 | Baldassara et al. |
| 2015/0209918 | A1 | 7/2015 | Andrews |
| 2015/0224635 | A1 | 8/2015 | Andrews |
| 2015/0290785 | A1 | 10/2015 | Zimmer et al. |
| 2017/0100825 | A1 | 4/2017 | Zeren et al. |
| 2017/0209994 | A1 | 7/2017 | Hargrove et al. |
| 2017/0297152 | A1 | 10/2017 | Andrews |
| 2017/0307020 | A1 | 10/2017 | Andrews |
| 2017/0361438 | A1 | 12/2017 | Andrews |
| 2018/0207776 | A1 | 7/2018 | Andrews |
| 2018/0370002 | A1 | 12/2018 | Andrews |
| 2023/0138801 | A1 | 5/2023 | Andrews |
| 2023/0142403 | A1 | 5/2023 | Andrews |

FOREIGN PATENT DOCUMENTS

| | | | |
|---|---|---|---|
| AU | 2015200630 | B2 | 5/2018 |
| AU | 2017225956 | A1 | 8/2018 |
| AU | 2017248765 | A1 | 9/2018 |
| AU | 2015200375 | B2 | 7/2019 |
| AU | 2017248765 | B2 | 11/2021 |
| CA | 2965264 | A1 | 4/2016 |
| CA | 2965324 | A1 | 4/2016 |
| CA | 3015834 | A1 | 9/2017 |
| CA | 3015852 | A1 | 10/2017 |
| CA | 2852069 | C | 1/2019 |
| CA | 2881390 | C | 4/2019 |
| CA | B037021 | A1 | 9/2019 |
| CA | 2880139 | C | 12/2019 |
| CA | 2890557 | C | 10/2020 |
| CA | 3015834 | C | 5/2021 |
| CN | 106414122 | A | 2/2017 |
| DE | 19631524 | C1 | 11/1997 |
| DE | 20113561 | U1 | 11/2001 |
| DE | 10221280 | C1 | 8/2003 |
| EP | 0988937 | A2 | 3/2000 |
| EP | 2461061 | A2 | 6/2012 |
| EP | 3423238 | A1 | 1/2019 |
| EP | 3442751 | A1 | 2/2019 |
| EP | 3423238 | A4 | 11/2019 |
| EP | 3442751 | A4 | 1/2020 |
| EP | 3423238 | B1 | 7/2023 |
| FR | 2387090 | A1 | 11/1978 |
| FR | 2670703 | A1 | 6/1992 |
| JP | 104800 | | 9/1974 |
| JP | 192877 | | 12/1987 |
| JP | 4105881 | B2 | 6/2008 |
| JP | 3160459 | U | 6/2010 |
| KR | 100746562 | B1 | 8/2007 |
| KR | 101746033 | | 6/2017 |
| KR | 101746033 | B1 | 6/2017 |
| RU | 2028933 | C1 | 2/1995 |
| SU | 654401 | A2 | 3/1979 |
| SU | 1207744 | A1 | 1/1986 |
| SU | 1384368 | A1 | 3/1988 |
| SU | 1505740 | A1 | 9/1989 |
| SU | 1632766 | A1 | 3/1991 |
| TW | 306377 | U | 5/1997 |
| TW | 471371 | U | 1/2002 |
| TW | M342918 | U | 10/2008 |
| TW | M497081 | U | 3/2015 |
| WO | 2011012552 | A1 | 2/2011 |
| WO | 2016065311 | A1 | 4/2016 |
| WO | 2016063140 | A3 | 6/2016 |
| WO | 2017151953 | A1 | 9/2017 |
| WO | 2017181078 | A1 | 10/2017 |

OTHER PUBLICATIONS

Greenerd, "Arbor Press History," Website http://www.greenerd.com/about-greenerd/history/default.aspxp.2, predates Mar. 13, 2020, 5 pages.
International Searching Authority, ISR & Written Opinion, PCT/IB2015/002481, dated May 10, 2017, 6 pages.
International Searching Authority, ISR & Written Opinion, PCT/US2015/057201, dated Dec. 22, 2015, 9 pages.
International Searching Authority, ISR & Written Opinion, PCT/US2017/020496, dated Jun. 1, 2017, 7 pages.
International Searching Authority, ISR & Written Opinion, PCT/US2017/027724, dated Aug. 177, 2017, 7 pages.
International Searching Authority, ISR & Written Opinion, PCT/US2018/049608, dated Dec. 6, 2018, 8 pages.
International Searching Authority, Isr & Written Opinion, PCT/US2021/021963, dated Jun. 3, 2021, 7 pages.
OTC, "Wheel Stud Remover/Installer," Product Brochure, 2009, 1 page, Product No. 5195.
OTC, "Wheel Stud Service Kit," Product Brochure, 2012, 1 page, Product No. 4295.
Semenov V. M., "Non-standard tool for dismantling and assembly work", Moskva, Izdatelstvo Kolos, (19750000), pp. 200-201, 219, 220, 253, 254, 257.
Toyota, "4Runner Repair Manual, Inspection and Repair of Front Axle Hub" 1990, p. 1 and SA-18, vol. 2, Publication No. RM143U2.
USPTO, "Final Office Action, U.S. Appl. No. 14/616,693," dated May 3, 2017, 10 pages.
USPTO, "Non-Final Office Action, U.S. Appl. No. 15/520, 196," dated Apr. 2, 2019, 8 pages.
Wikipedia, "Hydraulic Press," Website http://en.wikipedia.org/wiki/Hydraulic-pressp., predates Mar. 13, 2020, 1.
Registration Serial No. 302647759; Country China; Feeding Bottle Protective Sleeve; Inventor-Du Yaodong; Granted Nov. 20, 2013; 3 pages.

* cited by examiner

RETAINING RING PLIER SYSTEMS AND METHODS

RELATED APPLICATIONS

This application, U.S. patent application Ser. No. 17/450,039 filed Oct. 5, 2021, is a continuation of U.S. patent application Ser. No. 16/354,942 filed Mar. 15, 2019, currently pending.

U.S. patent application Ser. No. 16/354,942 filed Mar. 15, 2019, claims benefit of U.S. Provisional Application Ser. No. 62/644,326 filed Mar. 16, 2018.

The contents of all related applications are incorporated herein by reference.

TECHNICAL FIELD

The present invention relates to the installation and removal of retaining rings and, more specifically, to plier systems configured to facilitate the installation and/or removal of retaining rings.

BACKGROUND

Retaining rings are commonly used to maintain a part within a recess. The retaining ring is resiliently deformable. A retaining groove is formed in the recess, and the part is inserted into the recess past the groove. The retaining ring is deformed to a compressed configuration such that the retaining ring may be inserted into the recess aligned with the retaining groove. The retaining ring is then allowed to expand to an expanded configuration such that the retaining ring is at least partly received within the retaining groove. With the retaining ring at least partly received within the retaining groove in the expanded configuration, at least a portion of the retaining ring engages the part to inhibit removal of the part from the recess. To remove the part from the recess, the retaining ring is deformed from the expanded configuration to the compressed configuration and removed from the retaining groove.

The need exists for improved systems and methods for deforming retaining rings from the expanded configuration to the compressed configuration to facilitate installation and removal of such retaining rings.

SUMMARY

The present invention may be embodied as a plier assembly comprising first and second handle assemblies and a main hinge assembly. The first handle assembly comprises a first frame assembly, a first support block, a first tip assembly, a first proximal pin, and a second proximal pin. The first support block defines a first support block longitudinal axis, a first proximal opening, and a first distal opening. The first tip assembly is supported by the first support block. The first proximal pin extends through the first proximal opening to limit movement of the first support block relative to the first frame assembly. The first distal pin extends through the first distal opening to pivotably support the first support block relative to the first frame assembly. The second handle assembly comprises a second frame assembly, a second support block, a second tip assembly, a second proximal pin, and a second proximal pin. The second support block defines a second support block longitudinal axis, a second proximal opening, and a second distal opening. The second tip assembly is supported by the second support block. The second proximal pin extends through the second proximal opening to limit movement of the second support block relative to the second frame assembly. The second distal pin extends through the second distal opening to pivotably support the second support block relative to the second frame assembly. a main hinge assembly for supporting the second handle assembly for movement relative to the second handle assembly. The first and second proximal openings are sized and dimensioned such that, as the second handle assembly moves relative to the first handle assembly, the first and second support block longitudinal axes are substantially parallel.

The present invention may be embodied as a method of installing and removing retaining rings comprising the following steps. First and second handle assemblies are provided. The first handle assembly comprises a first frame assembly, a first support block, a first tip assembly, a first proximal pin, and a second proximal pin. The first support block defines a first support block longitudinal axis, a first proximal opening, and a first distal opening. The first tip assembly is supported by the first support block. The first proximal pin extends through the first proximal opening to limit movement of the first support block relative to the first frame assembly. The first distal pin extends through the first distal opening to pivotably support the first support block relative to the first frame assembly. The second handle assembly comprises a second frame assembly, a second support block, a second tip assembly, a second proximal pin, and a second proximal pin. The second support block defines a second support block longitudinal axis, a second proximal opening, and a second distal opening. The second tip assembly is supported by the second support block. The second proximal pin extends through the second proximal opening to limit movement of the second support block relative to the second frame assembly. The second distal pin extends through the second distal opening to pivotably support the second support block relative to the second frame assembly. a main hinge assembly for supporting the second handle assembly for movement relative to the second handle assembly. A main hinge assembly is arranged to support the second handle assembly for movement relative to the first handle assembly. The first and second proximal openings are sized and dimensioned such that, as the second handle assembly moves relative to the first handle assembly, the first and second support block longitudinal axes are substantially parallel.

DETAILED DESCRIPTION

Figure 1:
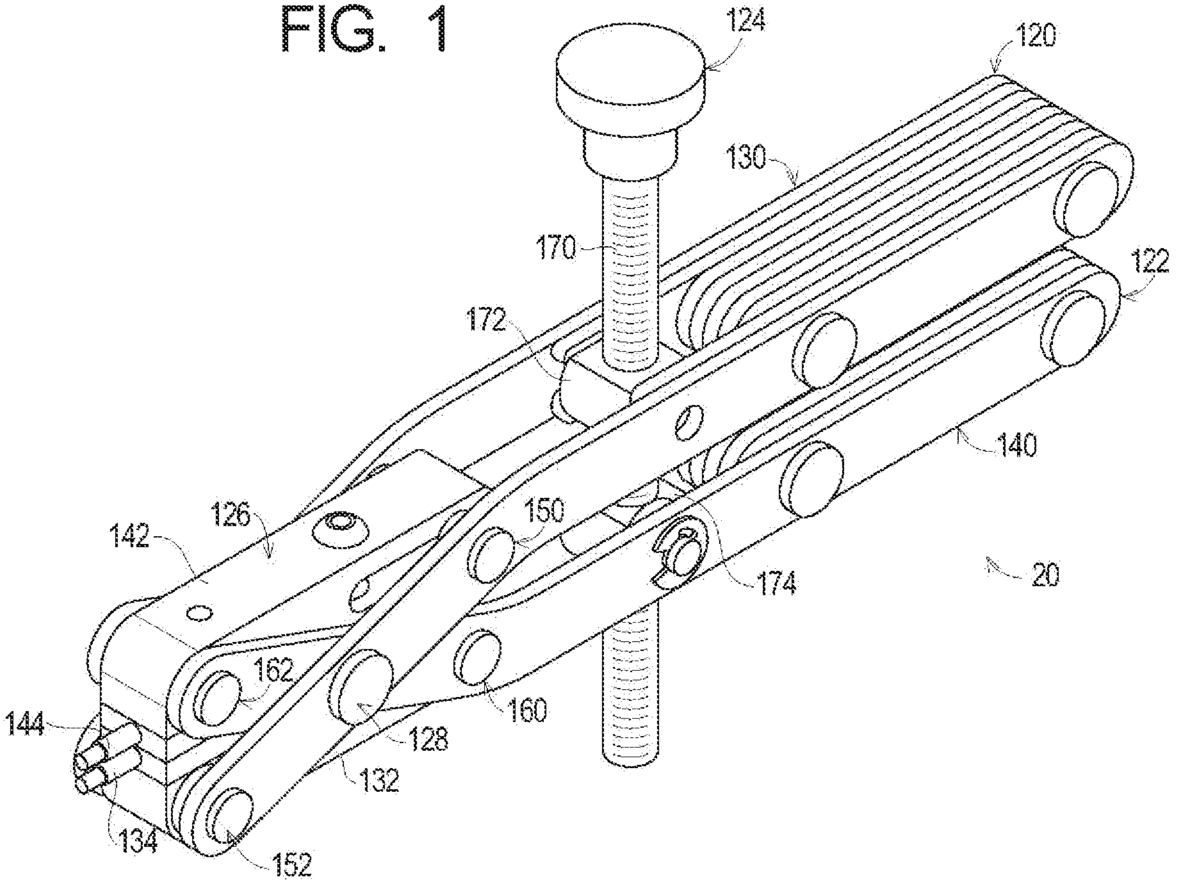
FIG. 1 is a perspective view of a first example plier assembly of the present invention.
Figure 2:
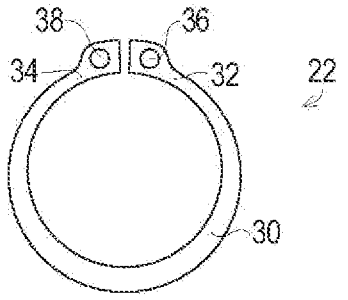
FIG. 2 is an elevation view of a retaining ring that may be reconfigured using the first example plier assembly.

FIG. 1 depicts a first example plier assembly 20 constructed in accordance with, and embodying, the principles of the present invention. The first example plier assembly 20 is configured to cooperate with an example retaining ring 22 to facilitate installation and removal of the example retaining ring 22.

The example retaining ring 22 comprises a collar portion 30, a first end portion 32, and a second end portion 34. First and second ring openings 36 and 38 are formed in the first and second end portions 32 and 34, respectively. The example retaining ring 22 is or may be constructed in used in a conventional manner, and the construction and use of the example retaining ring 22 will not be described herein beyond that extent necessary for a complete understanding of the construction and operation of the first example plier assembly 20.

The first example plier assembly 20 comprises a first handle assembly 120, a second handle assembly 122, a drive assembly 124, a bias assembly 126, and a main hinge assembly 128. The example main hinge assembly 128 supports the example first and second handle assemblies 120 and 122 for pivoting movement about a main pivot axis A defined by the main hinge assembly 128. The example drive assembly 124 is operatively connected between the example first and second handle assemblies 120 and 122 such that operation of the example drive assembly 124 causes pivoting movement of the first and second handle assemblies 120 and 122 relative to each other about the main pivot axis A.

The example first handle assembly 120 comprises a first frame assembly 130, a first support block 132, and a first tip assembly 134. The example second handle assembly 122 comprises a second frame assembly 140, a second support block 142, and a second tip assembly 144. The example first handle assembly 122 further comprises a first handle proximal pin assembly 150 and a first handle distal pin assembly 152. The example second handle assembly 122 further comprises a second handle proximal pin assembly 160 and a second handle distal pin assembly 162. The example first handle proximal pin assembly 150 and second handle distal pin assembly 162 support the second support block 142 relative to the first and second frame assemblies 130 and 140, and the example second handle proximal pin assembly 160 and first handle distal pin assembly 152 support the second support block 142 relative to the first and second frame assemblies 130 and 140.

The example drive assembly 124 comprises a drive rod 170, a first drive block 172 defining a pivot lock projection **172*a*, a second drive block 174, and pivot block retaining clips 176. The first drive block 172 is detachably attachable to the first frame assembly 130 as will be described in detail below, and the second drive block 174 is rotatably attached to the second frame assembly 140 by the pivot block retaining clips 176. The example drive rod 170 defines first and second threaded portions 170*a* and 170*b*, and the first and second drive blocks 172 and 174 are internally threaded to engage the first and second threaded portions 170*a* and 170*b*, respectively. The threaded portions 170*a* and 170*b* are configured to engage the first and second drive blocks 172 and 174 such that axial rotation of the drive rod 170 in a first direction displaces the drive blocks 172 and 174 towards each other and in a second direction displaces the first and second drive blocks 172 and 174 away from each other. A handle 178 may be secured to the drive rod 170** to facilitate axial rotation thereof.

Figure 3:
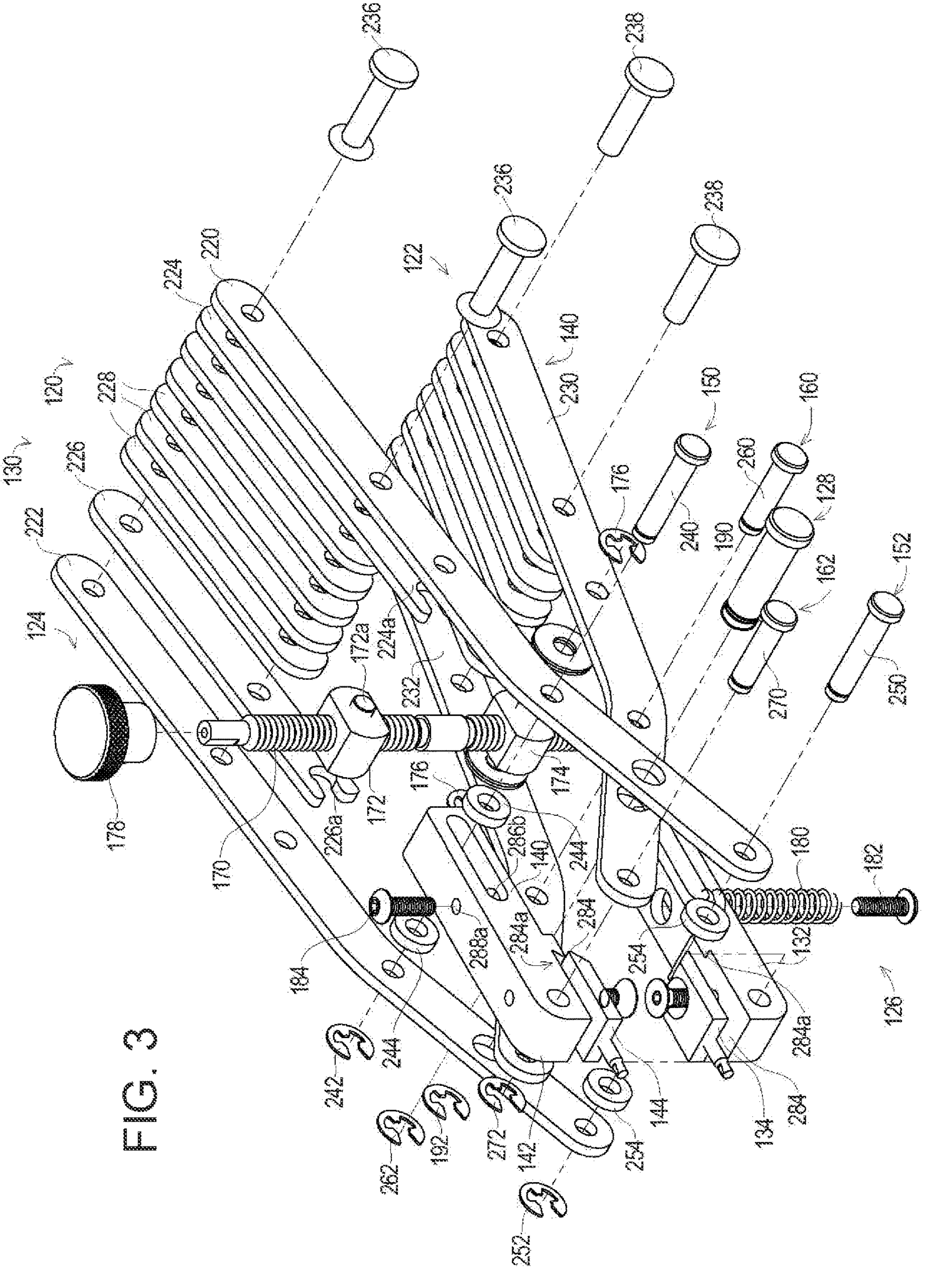
FIG. 3 is an exploded view of the first example plier assembly.
Figure 4:
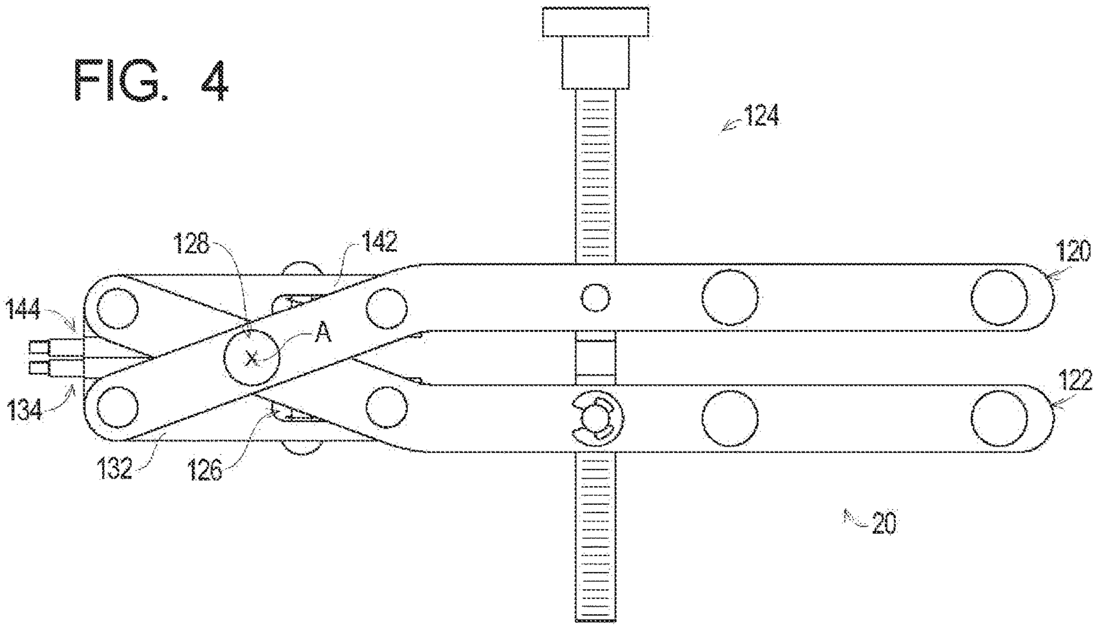
FIG. 4 is a side elevation view of the first example plier assembly in a closed configuration and with a drive assembly thereof in an engaged configuration.
Figure 5:
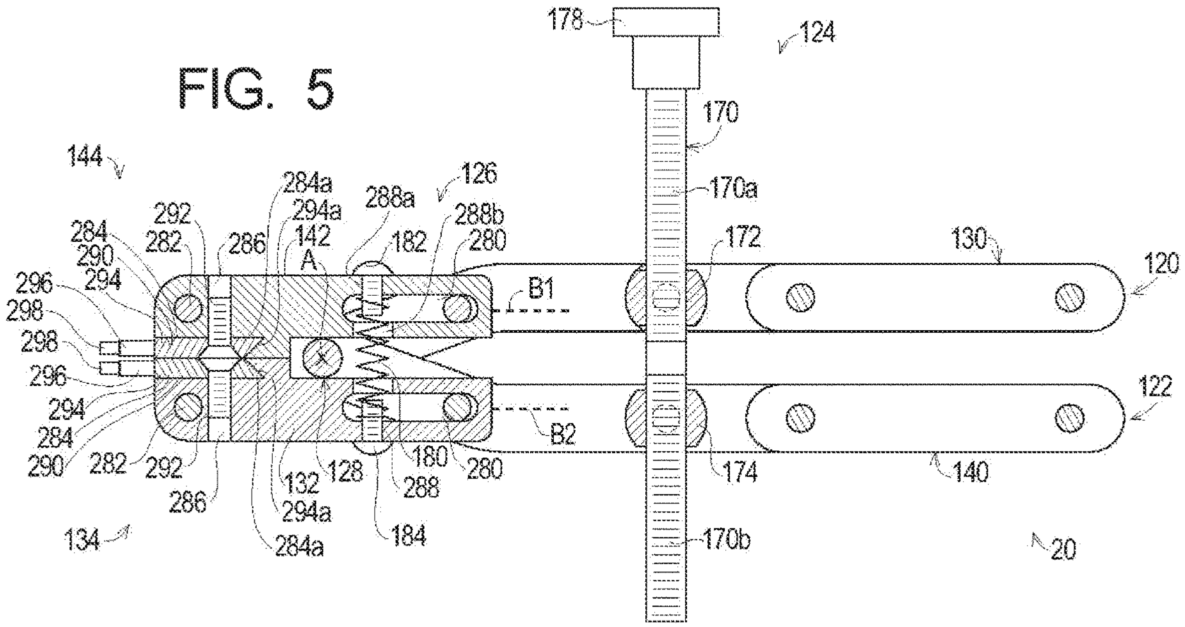
FIG. 5 is a side elevation cutaway view of the first example plier assembly in the closed configuration illustrating details of first and second tip assemblies thereof.
Figure 6:
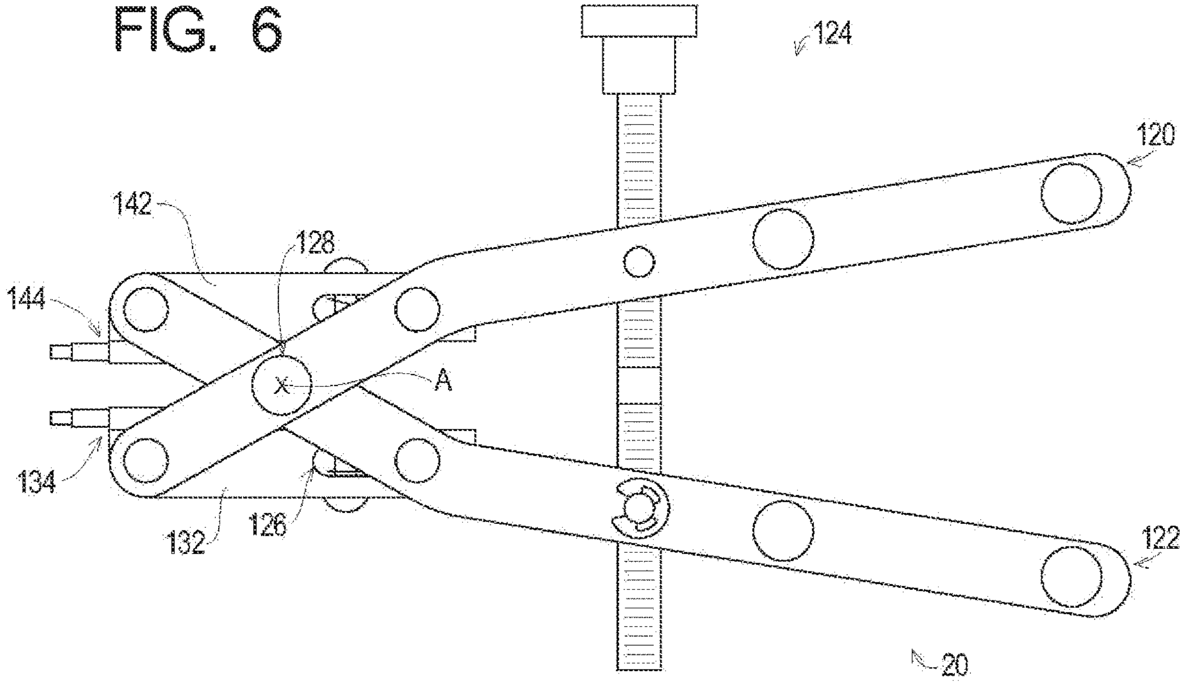
FIG. 6 is a side elevation view of the first example plier assembly in a partly open configuration.

The example bias assembly 126 is operatively arranged between the first and second support blocks 132 and 142 to bias the first and second support blocks 132 and 134 into a desired relative orientation during operation of the first example plier 20 as will be described in further detail below. As shown for example in FIGS. 3 and 5, the example bias assembly 128 comprises a spring 180 and first and second spring screws 182 and 184. The first spring screw 182 supports one end of the spring 180 relative to the first support block 132, while the second spring screw 184 supports the other end of the spring 180 relative to the second support block 142.

The example hinge assembly 128 comprises a main hinge pin 190 and a main hinge retaining clip 192. The main hinge pin 190 extends through the first and second frame assemblies 130 and 140 such that the first and second handle assemblies pivot about the main pivot axis A as will be discussed in further detail below.

The example first and second tip assemblies 134 and 144 are supported by the first and second support blocks 132 and 142, respectively, such that pivoting movement of the handle assemblies 120 and 122 about the main pivot axis A relative to each other cause the tip assemblies 134 and 144 to move towards and away from each other.

The first and second tip assemblies 134 and 144 are configured to engage the first and second ring openings 36 and 38. With the first and second support blocks 132 and 142 engaged with the first and second handle assemblies 120 and 122, respectively, axial rotation of the drive rod 170 in the first direction causes the support blocks 132 and 142, and first and second tip assemblies 134 and 144 supported thereby, to move towards each other and thus move the first and second ring openings 36 and 38 towards each other. Axial rotation of the drive rod 170 in the second direction causes the support blocks 132 and 142, and first and second tip assemblies 134 and 144 supported thereby, to move away from each other and thus move the first and second ring openings 36 and 38 away from each other. Axial rotation of the drive rod 170 in the first direction may thus place the example retaining ring 22 in a compressed configuration during installation and removal. Once the example retaining ring 22 is in the appropriate orientation, axial rotation of the drive rod 170 in the second direction may thus place the example retaining ring 22 in an expanded configuration when installed.

Further, the support blocks 132 and 142 are supported by the first and second frame assemblies 130 and 140 such that the support blocks maintain a desired angular relationship with each other. In particular, a longitudinal axis B1 of the example first support block 132 is substantially parallel to a longitudinal axis B2 of the example second support block 142 during relative pivoting movement of the first and second handle assemblies 120 and 122.

With the foregoing general understanding of the first example plier assembly 20 in mind, details of construction and operation of the first example plier assembly 20 will now be described.

The example first frame assembly 130 comprises a first outer frame member 220, a second outer frame member 222, a first lock plate 224 defining a first lock plate slot **224*a*, a second lock plate 226 defining a second lock plate slot 226***a*, and a plurality of first spacer plates 228. The example second frame assembly 140 comprises a first inner frame member 220, a second inner frame member 222, and a plurality of second spacer plates 224. A plurality of first handle fasteners 236 are used to form the first handle assembly 120, and a plurality of second handle fasteners 238 are used to form the second handle assembly 122.

The first handle proximal pin assembly 150 comprises a first proximal pin 240, a first proximal retainer clip 242, and first and second proximal spacers 244. The first handle distal pin assembly 152 comprises a first distal pin 250, a first distal retaining clip 252, and first and second distal spacers 254. The second handle proximal pin assembly 160 comprises a second proximal pin 260 and a second proximal retainer clip 262. The second handle distal pin assembly 162 comprises a second distal pin 270 and a second distal retaining clip 272.

The example first and second support blocks 132 and 142 are identical and will be described together. Each of the support blocks 132 and 142 defines a proximal opening 280, a distal opening 282, a tip recess 284, a tip screw opening 286, and first and second spring openings 288*a* and 288*b*. The example tip recess 284 defines an undercut portion 284*a*. The example support blocks 132 and 142 need not be identical.

The example first and second tip assemblies 134 and 144 are also identical and will be described together. Each of the tip assemblies 134 and 144 comprises a tip member 290 and a tip screw 292. The example tip members 290 each defines a mounting portion 294, an extension portion 296, and a tip portion 298. The example mounting portion 294 further defines an undercut surface 294*a*. The tip portions 298 are sized and dimensioned to fit within the first and second ring openings 36 and 38 of the example retaining ring 22. The example tip assemblies 134 and 144 need not be identical.

The mounting portions 294 of the tip members 290 are arranged in the tip recesses 284 of the support blocks 132 and 134, and the tip screws 294 are threaded through the tip members 290 and into the tip screw openings 286 to secure the tip members 290 to the support blocks 132 and 134. The undercut surface 294*a* may further be configured to engage the undercut portion 284*a* of the tip recess 284 defined by the support blocks 132 and 134 to inhibit twisting movement of the tip members 390 relative to the support blocks 132 and 134. In particular, the undercut surfaces 294*a* are angled relative to the axis B1 and B2, respectively, and surfaces of the support blocks 132 and 134 defining the undercut portion 284*a* of the tip recess 284 define angles that are complementary to the angles of the undercut surfaces 294*a*. The example tip members 290 thus engage the example support blocks 132 and 134 by forming half of a dovetail joint that effectively translates loads between the tip members 290 and the support blocks 132 and 134.

The example tip members 290 may be made of a higher quality, relatively rigid material (e.g., tempered steel) as compared to the material from which the remaining parts of the first example plier assembly 20 are fabricated. The relatively small diameter tip portions 298 of the tip members 290 thus are less likely to deflect under the loads necessary to compress the retaining ring 22, but the cost of the first example plier assembly 20 may be reduced. Further, the tip members 290 are easily replaceable if damaged or if a different size or shape of the tip portion 298 is desired.

Figure 7:
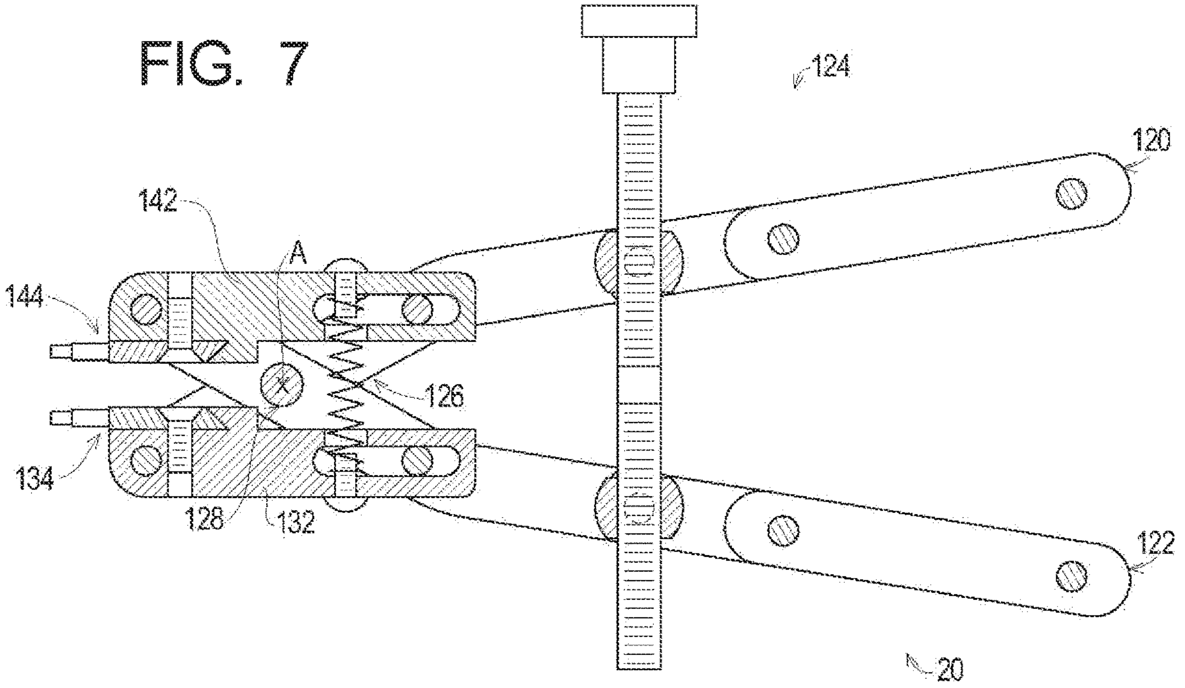
FIG. 7 is a side elevation cutaway view of the first example plier assembly in the partly opening configuration illustrating details of first and second tip assemblies thereof.
Figure 8:
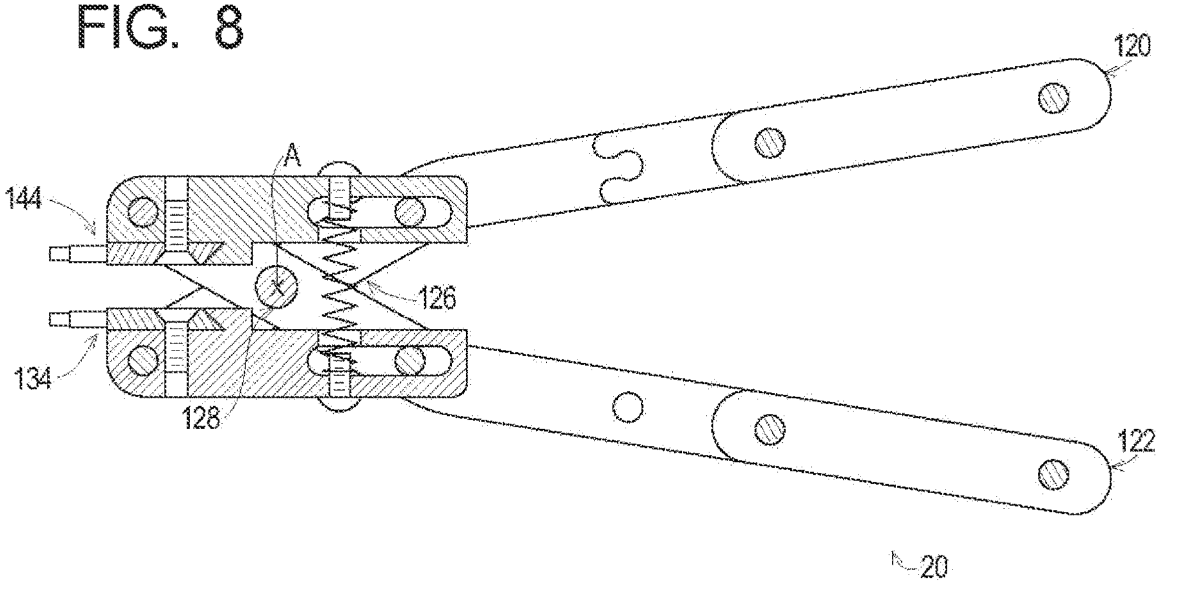
FIG. 8 is a side elevation cutaway view of the first example plier assembly in the partly opening configuration with the drive assembly thereof removed for clarity.
Figure 9:
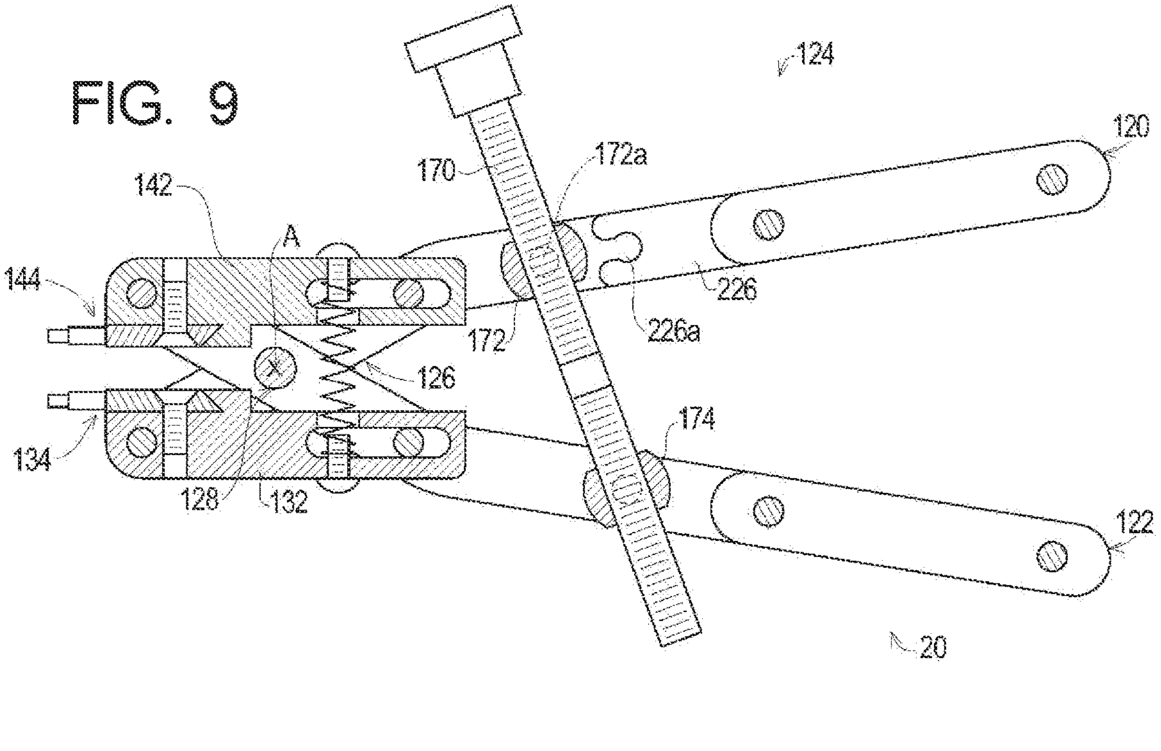
FIG. 9 is a side elevation cutaway view of the first example plier assembly in the partly opening configuration with the drive assembly thereof in a disengaged configuration.

As shown in FIGS. 7-9, the drive system 124 may be configured in an engaged configuration (FIG. 7) or a disengaged configuration (FIG. 9). In either configuration, the second pivot block 174 pivotably connects the drive rod 170 to the second handle assembly 122. And in the engaged configuration, the pivot lock projection(s) 172*a* extending from the first pivot block 172 engage the lock plate slots 224*a* and 226*a* formed in the lock plates 224 and 226. With the pivot lock projection(s) 172*a* received within the lock plate slots 224*a* and 226*a*, the first pivot block 172 is pivotably connected to the first handle assembly 120. In this engaged configuration, axial rotation of the drive rod 170 will displace at least a portion of the handle assemblies 120 and 122 towards and away from each other as described above. To place the drive system 124 in its disengaged configuration, the drive rod 170 is pivoted such that the pivot lock projection(s) 172*a* are removed from the lock plate slots 224*a* and 226*a*. In this disengaged configuration, the handles 120 and 122 may be rotated or pivoted relative to each other about the main pivot axis A without use of the drive system 124. The use of a drive system operable in engaged and disengaged configurations is optional, and the plier assembly of the present invention may be embodied with a drive system that is fixed in the engaged configuration and not reconfigurable into the disengaged configuration.

What is claimed is:

1. A plier assembly comprising:

a first handle assembly comprising
- a first frame assembly,
- a first support block defining a first support block longitudinal axis, a first proximal opening, and a first distal opening,
- a first tip assembly supported by the first support block,
- a first proximal pin, and
- a first distal pin;

a second handle assembly comprising
- a second frame assembly,
- a second support block defining a second support block longitudinal axis, a second proximal opening, and a second distal opening,
- a second tip assembly supported by the second support block,
- a second proximal pin, and
- a second distal pin; and a main hinge assembly comprising a main hinge pin for supporting the second handle assembly for movement relative to the first handle assembly; and a bias assembly a bias assembly arranged between the first and second support blocks and configured to apply a biasing force to the first and second support blocks, the bias assembly comprising
- a spring,
- a first spring screw to support a first end of the spring relative to the first support block, and
- a second spring screw to support a second end of the spring relative to the second support block; wherein the first proximal pin extends through the second proximal opening to limit movement of the second support block relative to the first frame assembly;

the first distal pin extends through the first distal opening to pivotably support the first support block relative to the first frame assembly;

the second proximal pin extends through the first proximal opening to limit movement of the first support block relative to the second frame assembly;

the second distal pin extends through the second distal opening to pivotably support the second support block relative to the second frame assembly;

the main hinge pin is arranged between the first and second support blocks; and the first and second proximal openings are sized and dimensioned such that, as the second handle assembly moves relative to the first handle assembly, the first and second support block longitudinal axes are substantially parallel.

2. A plier assembly as recited in claim 1, in which:

the first proximal opening is an elongate slot configured to allow movement of the first proximal pin in a direction parallel to the first support block longitudinal axis; and the second proximal opening is an elongate slot configured to allow movement of the second proximal pin in a direction parallel to the second support block longitudinal axis.

3. A plier assembly as recited in claim 1, further comprising a drive assembly supported between the first handle assembly and the second handle assembly such that operation of the drive assembly pivots the first handle assembly relative to the second handle assembly.

4. A plier assembly as recited in claim 3, in which the drive assembly is pivotably supported by the second handle assembly and detachably attachable to the first handle assembly.

5. A plier assembly as recited in claim 4, in which the drive assembly is detachably attached to the first handle assembly when operation of the drive assembly pivots the first handle assembly relative to the second handle assembly.

6. A plier assembly as recited in claim 5, in which the drive assembly is detached from the first handle assembly to allow the first handle assembly to pivot relative to the second handle assembly without operation of the drive assembly.

7. A plier assembly as recited in claim 3, in which the drive assembly comprises:

a first drive block adapted to engage the first handle assembly;

a second drive block adapted to engage the second handle assembly; and a drive rod adapted to engage the first and second drive blocks such that axial rotation of the drive rod displaces the first and second drive blocks in opposite directions relative to each other.

8. A plier assembly as recited in claim 7, in which:

the first drive block is detachably attachable to the first handle assembly; and the second drive block is pivotably supported by the second handle assembly.

9. A method of installing and removing retaining rings comprising the steps of:

providing a first handle assembly comprising a first frame assembly, a first support block defining a first support block longitudinal axis, a first proximal opening, and a first distal opening, a first tip assembly supported by the first support block, a first proximal pin, and a first distal pin;

providing a second handle assembly comprising a second frame assembly, a second support block defining a second support block longitudinal axis, a second proximal opening, and a second distal opening, a second tip assembly supported by the second support block, a second proximal pin extending through the second proximal opening to limit movement of the second support block relative to the second frame assembly, and a second distal pin extending through the second distal opening to pivotably support the second support block relative to the second frame assembly;

extending the first proximal pin through the second proximal opening to limit movement of the second support block relative to the first frame assembly;

extending the first distal pin through the first distal opening to pivotably support the first support block relative to the first frame assembly;

extending the second proximal pin through the first proximal opening to limit movement of the first support block relative to the second frame assembly;

extending the second distal pin through the second distal opening to pivotably support the second support block relative to the second frame assembly;

providing a main hinge assembly comprising a main hinge pin;

arranging the main hinge pin between the first and second support blocks to support the second handle assembly for movement relative to the first handle assembly;

sizing and dimensioning the first and second proximal openings such that, as the second handle assembly moves relative to the first handle assembly, the first and second support block longitudinal axes are substantially parallel; and arranging a bias assembly between the first and second support blocks to apply a biasing force to the first and second support blocks, where the step of arranging the bias assembly comprises the steps of providing a spring, arranging a first spring screw to support a first end of the spring relative to the first support block, and arranging a second spring screw to support a second end of the spring relative to the second support block.

10. A method as recited in claim 9, in which:

the first proximal opening is an elongate slot configured to allow movement of the first proximal pin in a direction parallel to the first support block longitudinal axis; and the second proximal opening is an elongate slot configured to allow movement of the second proximal pin in a direction parallel to the second support block longitudinal axis.

11. A method as recited in claim 9, further comprising the steps of:

supporting a drive assembly between the first handle assembly and the second handle assembly; and operating the drive assembly to pivot the first handle assembly relative to the second handle assembly.

12. A method as recited in claim 11, further comprising the steps of:

pivotably supporting the drive assembly from the second handle assembly; and detachably attaching the drive assembly to the first handle assembly.

13. A method as recited in claim 12, further comprising the step of detachably attaching the drive assembly to the first handle assembly when operation of the drive assembly pivots the first handle assembly relative to the second handle assembly.

14. A method as recited in claim 13, further comprising the step of the detaching the drive assembly from the first handle assembly to allow the first handle assembly to pivot relative to the second handle assembly without operation of the drive assembly.

15. A method as recited in claim 11, in which the step of supporting the drive assembly comprises the following steps:

arranging a first drive block to engage the first handle assembly;

arranging a second drive block to engage the second handle assembly; and arranging a drive rod to engage the first and second drive blocks such that axial rotation of the drive rod displaces the first and second drive blocks in opposite directions relative to each other.

16. A method as recited in claim 15, further comprising the steps of:

detachably attaching the first drive block to the first handle assembly; and pivotably supporting the second drive block on the second handle assembly.

17. A plier assembly comprising:

a first handle assembly comprising a first frame assembly, a first support block defining a first support block longitudinal axis, a first proximal opening, and a first distal opening, a first tip assembly supported by the first support block, a first proximal pin, and a first distal pin;

a second handle assembly comprising a second frame assembly, a second support block defining a second support block longitudinal axis, a second proximal opening, and a second distal opening, a second tip assembly supported by the second support block, a second proximal pin, and a second distal pin;

a main hinge assembly comprising a main hinge pin for supporting the second handle assembly for movement relative to the first handle assembly; and a drive assembly supported between the first handle assembly and the second handle assembly such that operation of the drive assembly pivots the first handle assembly relative to the second handle assembly, where the drive assembly comprises:

a first drive block adapted to engage the first handle assembly;

a second drive block adapted to engage the second handle assembly; and a drive rod adapted to engage the first and second drive blocks such that axial rotation of the drive rod displaces the first and second drive blocks in opposite directions relative to each other; wherein the first proximal pin extends through the second proximal opening to limit movement of the second support block relative to the first frame assembly;

the first distal pin extends through the first distal opening to pivotably support the first support block relative to the first frame assembly;

the second proximal pin extends through the first proximal opening to limit movement of the first support block relative to the second frame assembly;

the second distal pin extends through the second distal opening to pivotably support the second support block relative to the second frame assembly;

the main hinge pin is arranged between the first and second support blocks; and the first and second proximal openings are sized and dimensioned such that, as the second handle assembly moves relative to the first handle assembly, the first and second support block longitudinal axes are substantially parallel.

18. A plier assembly as recited in claim 17, in which:

the first proximal opening is an elongate slot configured to allow movement of the first proximal pin in a direction parallel to the first support block longitudinal axis; and the second proximal opening is an elongate slot configured to allow movement of the second proximal pin in a direction parallel to the second support block longitudinal axis.

19. A plier assembly as recited in claim 17, further comprising a bias assembly arranged between the first and second support blocks and configured to apply a biasing force to the first and second support blocks.

20. A plier assembly as recited in claim 19, in which the bias assembly comprises:

a spring, a first spring screw to support a first end of the spring relative to the first support block, and a second spring screw to support a second end of the spring relative to the second support block.

21. A plier assembly as recited in claim 17, in which the drive assembly is pivotably supported by the second handle assembly and detachably attachable to the first handle assembly.

22. A plier assembly as recited in claim 21, in which the drive assembly is detachably attached to the first handle assembly when operation of the drive assembly pivots the first handle assembly relative to the second handle assembly.

23. A plier assembly as recited in claim 22, in which the drive assembly is detached from the first handle assembly to allow the first handle assembly to pivot relative to the second handle assembly without operation of the drive assembly.

24. A plier assembly as recited in claim 17, in which:

the first drive block is detachably attachable to the first handle assembly; and the second drive block is pivotably supported by the second handle assembly.

25. A method of installing and removing retaining rings comprising the steps of:

providing a first handle assembly comprising a first frame assembly, a first support block defining a first support block longitudinal axis, a first proximal opening, and a first distal opening, a first tip assembly supported by the first support block, a first proximal pin, and a first distal pin;

providing a second handle assembly comprising a second frame assembly, a second support block defining a second support block longitudinal axis, a second proximal opening, and a second distal opening, a second tip assembly supported by the second support block, a second proximal pin extending through the second proximal opening to limit movement of the second support block relative to the second frame assembly, and a second distal pin extending through the second distal opening to pivotably support the second support block relative to the second frame assembly;

extending the first proximal pin through the second proximal opening to limit movement of the second support block relative to the first frame assembly;

extending the first distal pin through the first distal opening to pivotably support the first support block relative to the first frame assembly;

extending the second proximal pin through the first proximal opening to limit movement of the first support block relative to the second frame assembly;

extending the second distal pin through the second distal opening to pivotably support the second support block relative to the second frame assembly;

providing a main hinge assembly comprising a main hinge pin;

arranging the main hinge pin between the first and second support blocks to support the second handle assembly for movement relative to the first handle assembly;

sizing and dimensioning the first and second proximal openings such that, as the second handle assembly moves relative to the first handle assembly, the first and second support block longitudinal axes are substantially parallel;

supporting a drive assembly between the first handle assembly and the second handle assembly, where the step of supporting the drive assembly comprises the following steps:

arranging a first drive block to engage the first handle assembly;

arranging a second drive block to engage the second handle assembly; and arranging a drive rod to engage the first and second drive blocks such that axial rotation of the drive rod displaces the first and second drive blocks in opposite directions relative to each other; and operating the drive assembly to pivot the first handle assembly relative to the second handle assembly.

26. A method as recited in claim 25, in which:

the first proximal opening is an elongate slot configured to allow movement of the first proximal pin in a direction parallel to the first support block longitudinal axis; and the second proximal opening is an elongate slot configured to allow movement of the second proximal pin in a direction parallel to the second support block longitudinal axis.

27. A method as recited in claim 25, further comprising the step of arranging a bias assembly between the first and second support blocks to apply a biasing force to the first and second support blocks.

28. A method as recited in claim 27, in which the step of arranging the bias assembly comprises the steps of:

providing a spring, arranging a first spring screw to support a first end of the spring relative to the first support block, and arranging a second spring screw to support a second end of the spring relative to the second support block.

29. A method as recited in claim 28, further comprising the steps of:

pivotably supporting the drive assembly from the second handle assembly; and detachably attaching the drive assembly to the first handle assembly.

30. A method as recited in claim 29, further comprising the step of detachably attaching the drive assembly to the first handle assembly when operation of the drive assembly pivots the first handle assembly relative to the second handle assembly.

31. A method as recited in claim 30, further comprising the step of detaching the drive assembly from the first handle assembly to allow the first handle assembly to pivot relative to the second handle assembly without operation of the drive assembly.

32. A method as recited in claim 31, further comprising the steps of:

detachably attaching the first drive block to the first handle assembly; and pivotably supporting the second drive block on the second handle assembly.

* * * * *